(12) United States Patent
Freer et al.

(10) Patent No.: US 8,635,133 B2
(45) Date of Patent: Jan. 21, 2014

(54) SYSTEM AND METHOD FOR RELATIVISTIC STATISTICAL SECURITIES TRADING

(75) Inventors: Cameron E. Freer, Honolulu, HI (US);
Alexander D. Wissner-Gross, Cambridge, MA (US)

(73) Assignees: Massachusetts Institute of Technology, Cambridge, MA (US); President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 13/117,571

(22) Filed: May 27, 2011

(65) Prior Publication Data

US 2011/0295736 A1 Dec. 1, 2011

Related U.S. Application Data

(60) Provisional application No. 61/349,238, filed on May 28, 2010.

(51) Int. Cl.
*G06Q 40/00* (2012.01)

(52) U.S. Cl.
USPC .................................... 705/35; 709/201

(58) Field of Classification Search
USPC .......................................................... 705/35
See application file for complete search history.

(56) References Cited

U.S. PATENT DOCUMENTS

| | | | |
|---|---|---|---|
| 6,278,982 B1 * | 8/2001 | Korhammer et al. | 705/36 R |
| 7,653,700 B1 * | 1/2010 | Bahl et al. | 709/217 |
| 7,840,482 B2 * | 11/2010 | Singla et al. | 705/37 |
| 7,921,046 B2 * | 4/2011 | Parsons et al. | 705/35 |
| 7,921,050 B1 * | 4/2011 | Chadwick | 705/36 R |
| 2005/0015324 A1 * | 1/2005 | Mathews et al. | 705/37 |
| 2005/0137961 A1 | 6/2005 | Brann et al. | |
| 2007/0168276 A1 | 7/2007 | Glodjo et al. | |
| 2008/0270289 A1 | 10/2008 | Petrino | |
| 2009/0138413 A1 * | 5/2009 | Dubitsky et al. | 705/36 R |
| 2010/0205611 A1 * | 8/2010 | Wagner et al. | 719/313 |
| 2011/0004540 A1 * | 1/2011 | Siverson et al. | 705/37 |
| 2011/0071958 A1 * | 3/2011 | Grody et al. | 705/36 R |
| 2011/0295736 A1 * | 12/2011 | Freer et al. | 705/37 |
| 2012/0166327 A1 * | 6/2012 | Amicangioli | 705/37 |

FOREIGN PATENT DOCUMENTS

| | | | |
|---|---|---|---|
| EP | 1622078 A1 * | 2/2006 | |
| EP | 1691332 A1 * | 8/2006 | |

OTHER PUBLICATIONS

International Search Report and Written Opinion for International application No. PCT/US11/38330 mailed Dec. 7, 2011.

* cited by examiner

*Primary Examiner* — Kirsten Apple
(74) *Attorney, Agent, or Firm* — Wolf, Greenfield & Sacks, P.C.

(57) ABSTRACT

A system comprising a processor configured to calculate a location for a server along a communication link between a first trading center and a second trading center based at least in part on a property of the communication link. The server may be configured to send first trade instructions for trading a first financial instrument to the first trading center and send second trade instructions for trading a second financial instrument to the second trading center.

19 Claims, 9 Drawing Sheets

SYSTEM AND METHOD FOR RELATIVISTIC STATISTICAL SECURITIES TRADING

RELATED APPLICATIONS

The present application claims the benefit under 35 U.S.C. §119(e) of U.S. Provisional Application Ser. No. 61/349,238, filed May 28, 2010, entitled "SYSTEM AND METHOD FOR RELATIVISTIC STATISTICAL SECURITIES TRADING," which is incorporated herein by reference in its entirety.

BACKGROUND

Financial markets allow for the buying and selling of a broad variety of financial instruments including stocks, bonds, and commodities. In some markets, financial instruments can be traded electronically by using computer technology. The speed at which such computer technology can operate, enables high-frequency (electronic) trading—the trading of financial instruments multiple times in a short time period. High-frequency trading is widespread. Indeed, by some estimates, high-frequency trading accounts for over seventy percent of equity trades in the United States.

Today, high-frequency trading platforms and algorithms are used to trade financial instruments at such high speeds, that latencies between a trading order (e.g., "buy 300 shares of stock A") and a response to the trading order (e.g., "order has been filled") are often below 500 microseconds. Accordingly, high-frequency traders are able to take advantage of opportunities occurring at microsecond level rather than conventional "long-term" investing at time scales of months or years.

High-frequency traders compete with one another to take advantage of short-term market opportunities on the basis of how fast the traders can execute high-frequency trades. The faster a high-frequency trader can trade, the more he is able to take advantage of available opportunities. The speed of high-frequency trading depends on computers, networks, and software used to implement it.

SUMMARY

Accordingly, in some embodiments a system for calculating a server location may be provided. The system may comprise a processor configured to calculate a location for a server along a communication link between a first trading center and a second trading center based at least in part on a property of the communication link.

In some embodiments, a method for calculating a server location may be provided. The method may comprise calculating, with a processor, a location for a server along a communication link between a first trading center and a second trading center based at least in part on a property of the communication link.

In some embodiments, a computer-readable storage medium may be provided. The computer-readable storage medium may be encoded with processor-executable instructions that, when executed by a processor, cause the processor to perform a method comprising calculating, with a processor, a location for a server along a communication link between a first trading center and a second trading center based at least in part on a property of the communication link.

In some embodiments, a system for selecting one or more trading centers may be provided. The system may comprise a server configured to select a first trading center from a plurality of trading centers based at least in part on a characteristic of a first financial instrument traded at the first trading center and a property of a communication link between the first trading center and a second trading center in the plurality of trading centers.

In some embodiments, a method for selecting one or more trading centers may be provided. The method may comprise selecting, with a server at a predetermined location, a first trading center from a plurality of trading centers based at least in part on a characteristic of a first financial instrument traded at the first trading center and a property of a communication link between the first trading center and a second trading center in the plurality of trading centers.

In some embodiments, a computer-readable storage medium may be provided. The computer-readable storage medium may be encoded with processor-executable instructions that, when executed by a processor, cause the processor to perform a method comprising selecting, with a server at a predetermined location, a first trading center from a plurality of trading centers based at least in part on a characteristic of a first financial instrument traded at the first trading center and a property of a communication link between the first trading center and a second trading center in the plurality of trading centers.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
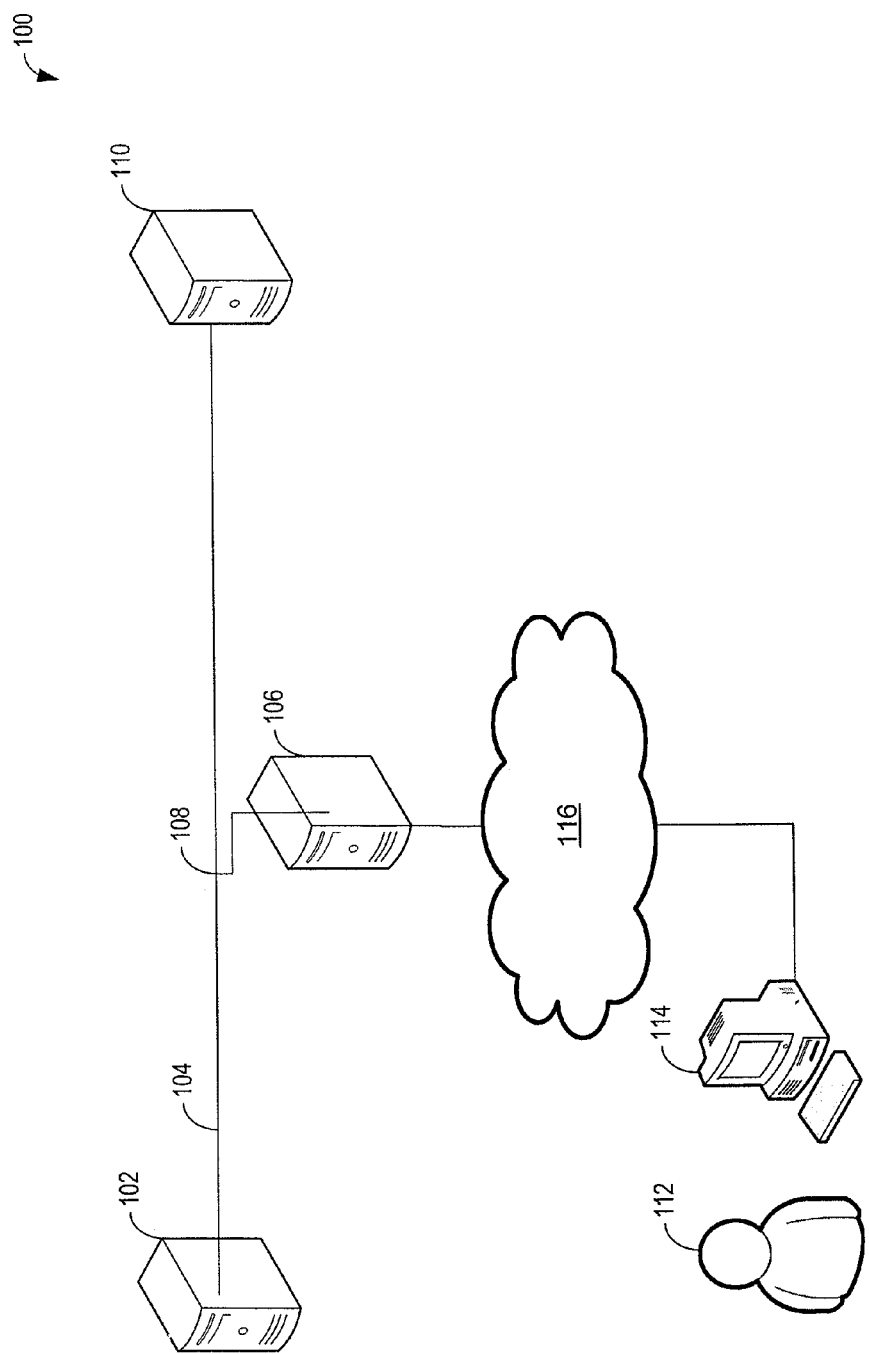
FIG. 1 is a block diagram of an exemplary operating environment for a system in accordance with some embodiments of the present disclosure.

The inventors have recognized that the success of a high-frequency trading (HFT) strategy depends on the speed at which financial transactions are executed and that this speed depends on the amount of time it takes for information to propagate through the computer infrastructure (e.g., computers, databases, networks, etc.) used to implement the high-frequency trading strategy. The inventors have appreciated that information propagation latencies lead to delays that may limit the effectiveness of HFT strategies because these delays may limit how quickly HFT systems may trade.

The inventors have recognized and appreciated that delays due to information propagation latencies are more pronounced when portions of the computer infrastructure are not located in one place. In this case, the amount of time it takes for information to propagate through the computer infrastructure may be greater than in the case when all the computer infrastructure is co-located. For instance, the latency between the time a computer in one location (e.g., London) sends a buy order to a trading center in a second location (e.g., New York) and the time the computer receives a response to the order from the trading center may depend on the amount of time it takes for the order information and for the response to travel between these locations.

It should be appreciated that trades in conventional HFT systems may occur on the micro-second scale, whereas 67 milliseconds (several orders of magnitude higher) are required for light to travel between antipodal points along the Earth's surface. Thus, the amount of time for information to travel between two geographically-separated locations may impact how quickly trading, distributed across geographically-separate locations, can take place.

Though such disparity is especially pronounced for HFT strategies that utilize geographically-separated computer infrastructure, information propagation delays are relevant across much shorter distances (e.g., even a single city block).

The inventors have further recognized and appreciated that information propagation latencies may limit the speed at which high-frequency strategies for distributed trading may operate. Consider a distributed high-frequency strategy that involves selling one security at a trading center in London (e.g., London stock exchange) and simultaneously buying another security at a trading center in New York (e.g., NASDAQ). Conventional approaches to implementing such a distributed and coordinated trading strategy comprise using a server co-located with one of the two trading centers to execute the strategy—the computer places orders to each of the trading centers and receives responses from the trading centers. Accordingly, these conventional approaches are limited by the amount of time it takes for information to propagate along a communication link between the two trading centers.

The inventors have recognized and appreciated that it may be advantageous to control the placement of the server used to execute a coordinated trading strategy in order to reduce the latency of information propagation. Controlling the placement of the server may address some of the shortcomings of the above-described conventional approaches for implementing distributed high-frequency strategies. However, not every embodiment addresses every one of these drawbacks, and some embodiments may not address any of them. As such, it should be appreciated that the invention is not limited to addressing all or any of the above-discussed drawbacks of these conventional approaches.

Placing a server at a location along a communication link between two trading centers in a way that reduces the latencies of information propagation during a distributed trade may allow such trades to occur more frequently and may allow high-frequency distributed trading to occur at a higher speed than using a conventional approach in which a server is co-located with one of the trading centers. As described in greater detail below, the suitability of a location to place the server may be evaluated based on the nature of the distributed trade (e.g., characteristics of the financial instruments traded) and/or a property of the communication link between the two trading centers (e.g., the latency of information propagation along the link).

The inventors have further appreciated that it may not be possible to place a server used to execute coordinated trades at some locations along a communication link between two trading centers. For instance, if trading centers in New York and London were connected by a trans-oceanic fiber-optic cable, it may be prohibitively expensive or impractical to place the server at a location in the ocean, if such a location were determined to be the most suitable location to place the server.

The inventors have further recognized that if the location of the server used to execute distributed trades were fixed, then the trading centers used to execute the coordinated trade may be selected in a way that reduces the latencies of information propagation during the trade. For instance, if it were possible to execute a coordinated trade using trading centers in New York and London or trading centers in Hong Kong and Chicago, then the server may select one of these pairs to execute the coordinated trade. As described in greater detail below, this selection may be informed by the nature of the coordinated trade (e.g., characteristics of the financial instruments traded), the location of the server used to execute the trading, and a property of the communication link between the two trading centers.

A block diagram of an illustrative system 100 comprising a server 106 for controlling the execution of a distributed trade is shown in FIG. 1. Server 106 may be configured to control execution of a distributed trade by sending one set of trade instructions to trading center 102 and another set of trade instructions to trading center 110. The trading centers may execute trades in response to the instructions received from the server 106 and may send information confirming the execution of the trades back to server 106. Alternatively, one or both of the trading centers may not execute a trade and may send confirmation to server 106 indicating the trade was not performed.

Server 106 may be embodied in any of numerous forms, such as a rack-mounted computer, a desktop computer, a laptop computer, or a tablet computer. Additionally, server 106 may be embodied in a device not generally regarded as a computer, but with suitable processing capabilities, including a Personal Digital Assistant (PDA), a smart phone or any other suitable portable or fixed electronic device. Additionally, server 106 may be embodied as a network switch capable of operating at one or more network layer (i.e., any layer of the Open Systems Interconnection Model).

Trading center 102 and trading center 110 may provide facilities and/or services for traders to trade financial instruments. Trading centers may allow human traders to trade financial instruments and/or may allow trades to be entered electronically by a computer. Trading centers may comprise one or more computers and one or more networks connecting these computers. A trading center may be any of numerous types of trading centers such as a financial exchange (e.g., New York Stock Exchange, NASDAQ, London Stock Exchange, etc.) or an over-the-counter market.

Each trading center may receive trade instructions comprising order information, process the received instructions, and send out responses to the received trade instructions.

Trading center 102 and trading center 110 may be communicatively coupled by communication link 104. Communication link 104 may be any suitable communication link and may be realized using any of numerous technologies. In some embodiments, communication link 104 may be a wired link and may comprise a transmission line designed to carry electromagnetic waves. The transmission line may be any suitable type of transmission line and may be a ladder line, coaxial cable, a fiber optic cable, and/or a waveguide. In some embodiments, the communication link may comprise a single type of wired connection (e.g., the link may consist only fiber optic cable), while in other embodiments different types of transmission lines may be used together. Additionally, the communication link may comprise any hardware necessary for facilitating information transport across the link over any suitable distance. For instance, the communication link may comprise one or more repeaters.

In some embodiments, communication link 104 may be a wireless link implemented using any suitable wireless technology to facilitate information transport without use of wires. Communication link 104 may transmit information using electromagnetic waves of any suitable frequency. For example, frequencies in the radio, microwave, visible, infrared, and ultra-violet ranges of the electromagnetic spectrum may be used. Communication link 104 may comprise any wireless technology for transmitting information including satellites, transmitters, receivers, antennas, repeaters, and/or radios. Still in other embodiments, communication link 104 may comprise both wired and wireless communication links. For instance, one segment of the communication link may be fiber-optic cable and another segment of the communication link may be realized using radio-frequency communications equipment.

Server 106 may be operatively coupled to communication link 104 at location 108. Location 108 may be a location at which or near which the server is operatively coupled to communication link 104 may be a location chosen to reduce the latency executing a distributed trade by reducing the latency of information propagation during the trade. It should be appreciated that the latency of information propagation from server 100 to trading center 102 may depend on the location 108. The way in which location 108 is chosen is described in greater detail below with reference to FIG. 7.

Accordingly, server 106 may send information to and receive information from trading centers 102 and 110 by using communication link 104. Communication link 104 may transport information from server 106 at location 108 to the location of trading center 102 or the location of trading center 104. In this way, server 106 may use communication link 104 to send trade instructions to trading center 102 and trading center 110 as well as receive confirmations of completed trades from these trading centers.

Trade instructions sent from server 106 to either one of the trading centers may be any instructions indicating one or more orders to be executed at the trading center. Each order many be any of numerous types of orders and may be an order corresponding to one or more financial instruments traded at the trading center. An order may be an order to buy and/or to sell one or more financial instruments. An order may be a market order (buy/sell at the current market price) or a limit order (buy/sell only at a certain price). Though, trade instructions may be any instructions for any order that a trading center is able to process, as the invention is not limited in this respect.

Trade instructions sent from server 106 to trading center 102 may be different than the trade instructions sent from server 106 to trading center 110. For instance, trade instructions sent to trading center 102 may be instructions to buy an amount (e.g., number of shares) of one financial instrument, whereas trade instructions sent to trading center 110 may be instructions to sell an amount of another financial instrument.

Trade instructions sent to trading center 102 and trading center 110 may specify any of numerous trading strategies.

For example, the instructions may specify a statistical arbitrage trade such as a pairs trade. A pairs trade may comprise betting on a temporary variation in prices of two related (e.g., correlated and/or cointegrated) financial instruments. For instance, a pairs trade may comprise betting that the price of one financial instrument may increase and the price of another financial instrument may decrease. Pairs trading may be accomplished by appropriately selling and buying these financial instruments as is known in the art. A pairs trade may also comprise betting on other aspects of the behavior of financial instruments such as volatility. Though, the instructions may specify other statistical arbitrage strategies that are known in the art such as multi-factor statistical arbitrage and volatility arbitrage. Still other distributed trading strategies, not only those related to statistical arbitrage, may be used as the invention is not limited in this respect.

Trade instructions may comprise orders for buying and selling one or more financial instruments. A financial instrument may be any of numerous financial instruments. For instance, a financial instrument may be an equity, a fixed-income product, a currency, a depository receipt, a derivative, and/or a foreign-exchange instrument. An equity may be any suitable equity and may be a stock. A fixed income product may be any suitable fixed income product such as deposits, Treasury bills, commercial paper, a certificate of deposit, a bond (of any type), and an annuity. A derivative may be any suitable derivative contract including options, futures, forwards, swaps, and repurchase agreements. Though, the above list of financial instruments is not an exhaustive list of financial instruments and any financial instrument, for which an order may be processed at a trading center, may be used.

Financial instruments may be traded at one or multiple trading centers. For instance, they may be "cross-listed" at multiple exchanges. In the illustrative example of FIG. 1, a financial instrument may be traded both at trading center 102 and at trading center 110. As such server 106 may send trade instructions to trade that financial instrument at either one or both of the trading centers.

Server 106 may be configured to control the execution of any suitable trading strategy. In some embodiments, server 106 may be configured to control the execution of a trading strategy by a human user. In the illustrative example of FIG. 1, server 106 may be configured by user 112. User 112 may configure server 106 remotely by using computer 114, which may be connected to server 106 via network 116. Network 116 may comprise, for example, the Internet, a LAN, a WAN and/or any other wired or wireless network, or combination thereof. Computer 114 and server 106 may communicate through any suitable networking protocol because the manner in which information is transferred between computer 114 and server device 106 is not a limitation of the present invention.

Illustrative system 100 may be implemented in any number of ways. For instance, though not depicted in FIG. 1, system 100 may comprise any suitable number of trading centers (i.e., more than two trading centers) and server 106 for controlling execution of a trading strategy may be configured to send trade instructions to and receive information from any of the trading centers. Also, trading center 102, trading center 110, server 106, and computer 106 may comprise a computer or a plurality of computers, as the invention is not limited in this respect.

Figure 2:
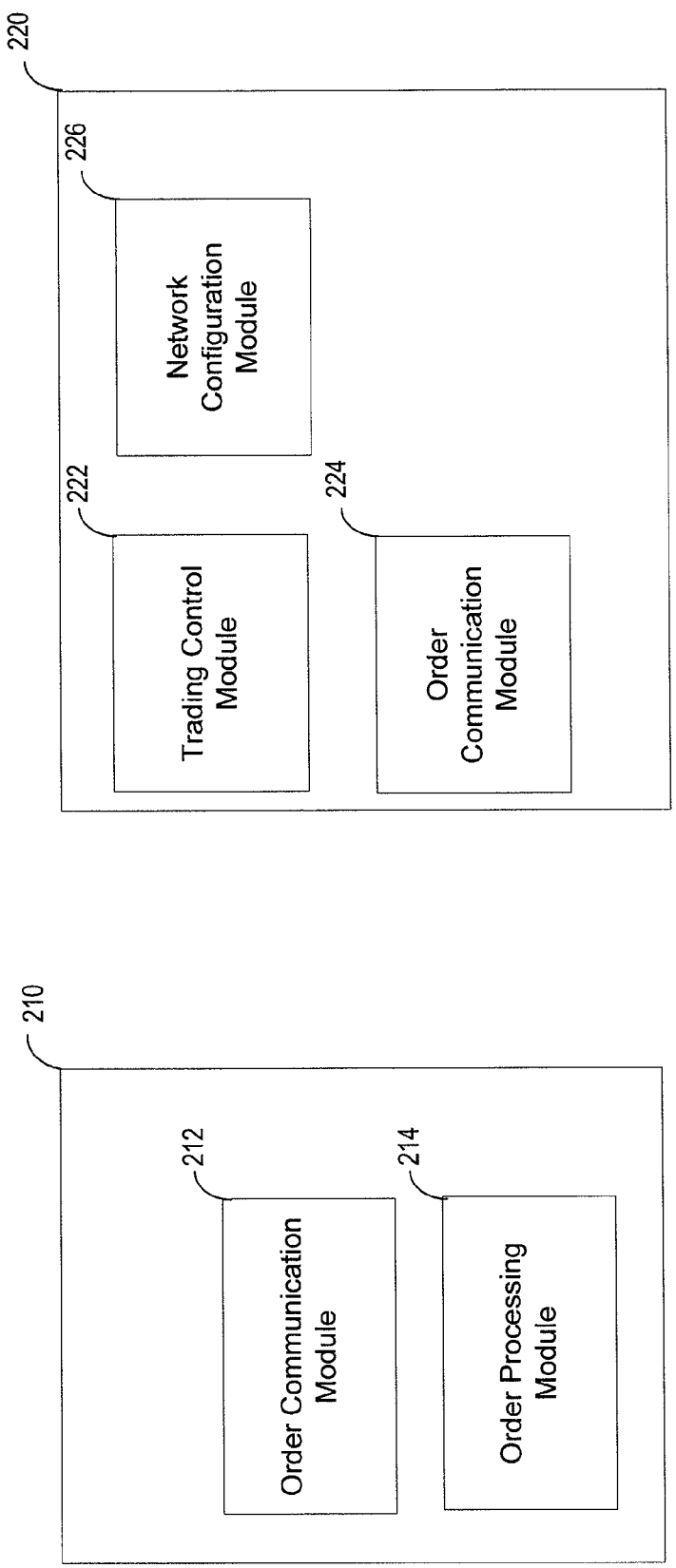
FIGS. 2a and 2b are block diagrams illustrating a trading center and a server in accordance with some embodiments of the present disclosure.

FIGS. 2a and 2b show illustrative block diagrams of software components that may execute at a trading center (e.g., trading center 102) and server 106 to perform or help to perform functions described with reference to FIG. 1. FIG. 2a. shows an illustrative block diagram of software components of an electronic trading center 210. In the embodiment illustrated, the software components may be stored as computer-executable instructions and configuration parameters in a memory coupled to trading center 210.

In the illustrated embodiment, trading center 210 includes an order communication module 212. Components within the order communication module may perform functions related to receiving trade instructions and sending out responses to received trade instructions. For instance, components within the order communication module 212 may receive trade instructions indicating an order to buy a financial instrument and/or to sell a financial instrument. Components within the order communication module 212 may send out a response to the trade instructions indicating, for example, whether or not the order was filled. It should be appreciated that order communication module 212 may receive any instructions for any type of order that may be executed by trading center 210.

Trading center 210 may also comprise order processing module 214. Components within module 214 may be used to execute orders received by order communication module 212, and they may execute orders in any suitable way as known in the art. For instance, components within module 214 may maintain an electronic order queue to keep track of the trade instructions and the order (i.e., time sequence) in which they arrived. Components within module 214 may execute some orders and may not execute other orders depending on market conditions.

It should be recognized that the software components illustrated in FIG. 2a are merely illustrative and that trading center 210 may be implemented in any other suitable way. It may have additional functionality not described in the example of FIG. 2a and any functionality that was described in reference to FIG. 2a may be implemented differently, as the invention is not limited in this respect. Finally, any of the software modules described with reference to FIG. 2a may be alternatively be implemented in hardware or using a combination of software and hardware.

FIG. 2b shows an illustrative block diagram of software components that may execute within server 220. In the illustrated embodiment, software components may be stored as computer-executable instructions and configuration parameters in computer-readable storage media associated with server 220. Components within the trading control module 222 may perform functions related to executing a distributed trading strategy comprising the trading of one or more securities at multiple trading centers. Accordingly, components within module 222 may control the execution of a trade distributed across multiple trading centers.

Components within module 222 may determine a time at which a trade should be made and what the trade should be. The components may determine which financial instruments should be traded as part of at trade, amounts of each instrument that should be traded (e.g., number of shares of a stock), and the manner in which they should be traded (e.g., bought or sold) traded in a trade. Accordingly, the components of module 222 may be used to specify trade instructions for the trade. Further, components within module 222 may be used to determine whether trade conditions—criteria for making trades—have been met.

Server 220 may comprise an order communication module 226. Components of order communication module 226 may perform functions related to sending trade instructions to one or more trading centers and receiving responses to the trade instructions, or any other communications, from the one or more trading centers. For instance, components within the order communication module 224 may send trade instructions indicating an order to buy a financial instrument and/or to sell a financial instrument. Components within the order communication module 224 may receive a response to the trade instructions indicating, for example, whether or not the order was filled.

Server 220 may comprise a network configuration module 226. Components within network communication module 226 may be used to configure server 220 to communication with one or more trading centers (e.g., first and second trading centers described with reference to FIG. 1) and may configure server 220 to communicate with the trading centers along a specific communication link. In addition, components in network communication module 226 may allow for server 220 to be configured remotely. For instance, they may allow for server 220 to be configured remotely by user 112 as described with reference to FIG. 1.

It should be recognized that the software components illustrated in FIG. 2b are merely illustrative and that server 220 may be implemented in any other suitable way. Server 220 may have additional functionality not described in the example of FIG. 2b and any functionality that was described in reference to FIG. 2a may be implemented differently, as the invention is not limited in this respect. Finally, any of the software modules described with reference to FIG. 2b may be alternatively implemented in hardware or using a combination of software and hardware.

Recall that if the location of a server (e.g., server 106) used to execute a distributed and coordinate trading with multiple trading centers were fixed, then the trading centers used to execute the coordinated trade may be selected in a way that reduces the latencies of information propagation during the trade. A system operating in accordance with this observation is illustrated in FIG. 3.

Figure 3:
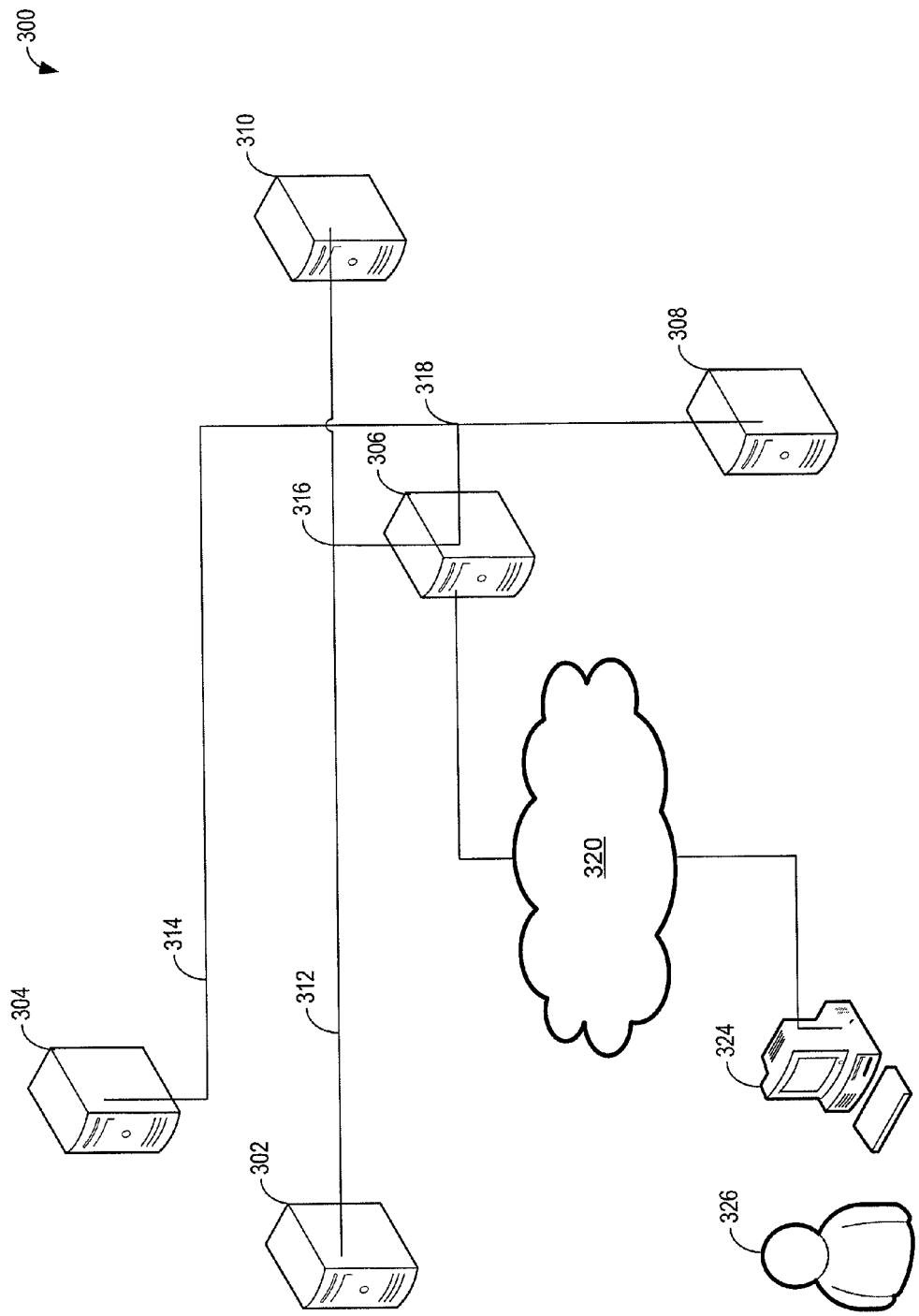
FIG. 3 is a block diagram of another exemplary operating environment for a system in accordance with some embodiments of the present disclosure.

FIG. 3 shows a block diagram of an illustrative system 300 comprising a server 306 for controlling the execution of a distributed trade. In the illustrative system 300, server 306 is communicatively coupled, at (or near) location 316, to communication link 312 between trading center 302 and trading center 310. Server 306 is also communicatively coupled, at (or near) location 318, to communication link 314 between trading center 304 and trading center 308.

Server 306 may be configured to select one or more trading centers. Server 306 may control execution of a distributed and coordinated trade on the selected trading centers. Server 306 may select a pair of trading centers to which it is connected. The pair of trading centers may be communicatively coupled by a communication link. In the illustrative example of FIG. 3, server 306 may select the trading centers 302 and 310 or may select the trading centers 305 and 308 to execute a trade.

Server 306 may select one or more trading centers to execute a trade in any of numerous ways. The selection may depend on the location at which or near which server 306 is coupled to a communication link between one of the selected trading centers and another trading center. The selection may depend at least in part on a characteristic of one or more financial instruments traded at one of the trading centers. When at least two trading centers are selected, the selection may also depend on a property of the communication link between the two trading centers. The way in which the trading centers are chose is described in greater detail below with reference to FIG. 8.

Server 306 may be embodied in any of numerous forms and may be embodied in one of the forms that server 106 may be embodied in, as described with reference to FIG. 1. For instance, server 306 may be a PDA, a desktop computer, and a network switch. Though may other embodiments of server 306 are possible as the invention is not limited in this respect.

Server 306 may control a distributed trade in a pair of trading centers. To this end, server 306 may be configured to send one set of trade instructions to one trading center in a pair of trading centers and another set of trade instructions to another trading center in the pair. For example, server 306 may send one set of trade instructions trading center 302 (or 304) and another set of trade instructions to trading center 310 (or 308). As is the case with system 100, the trading centers may execute trades in response to the instructions received from the server 306 and may send information confirming the execution of the trades back to server 306. Alternatively, one or both of the trading centers may not execute a trade and may send confirmation to server 306 indicating the trade was not performed.

In system 300, communication links 312 and 314 may be any suitable communication links and may be communication links of the type described with reference to FIG. 1. Similarly, trading centers and trade instructions may be any suitable trading centers and trade instructions and may be trading centers and trade instructions of the type described with reference to FIG. 1.

Server 306 may be configured to control the execution of any suitable trading strategy. It may be configured automatically by a computer or manually by a human user. For instance, server 306 may be configured by user 326. User 326 may configure server 306 remotely by using computer 324 connected to server 306 via network 320.

It should be appreciated that many variations of illustrative system 300 are possible. For instance, though not depicted in FIG. 3, system 300 may comprising any suitable number of trading centers and server 306 may be configured to select one or more trading centers from among any number of trading centers (not just four as illustrated in FIG. 3). Each trading center, server and computer shown in FIG. 3 may comprise a computer or a plurality of computers, as the invention is not limited in this respect.

In the illustrative systems 100 and 300, described with respect to FIGS. 1 and 3, servers 106 and 306 may not be co-located with the trading centers and, instead, may be located at intermediate locations along communication links between the trading centers. Placement of servers for controlling execution of a distributed trade in this manner may reduce the latency of information propagation during the trade relative to conventional techniques. This is illustrated using space-time diagrams shown in FIGS. 4 and 5.

Figure 4:
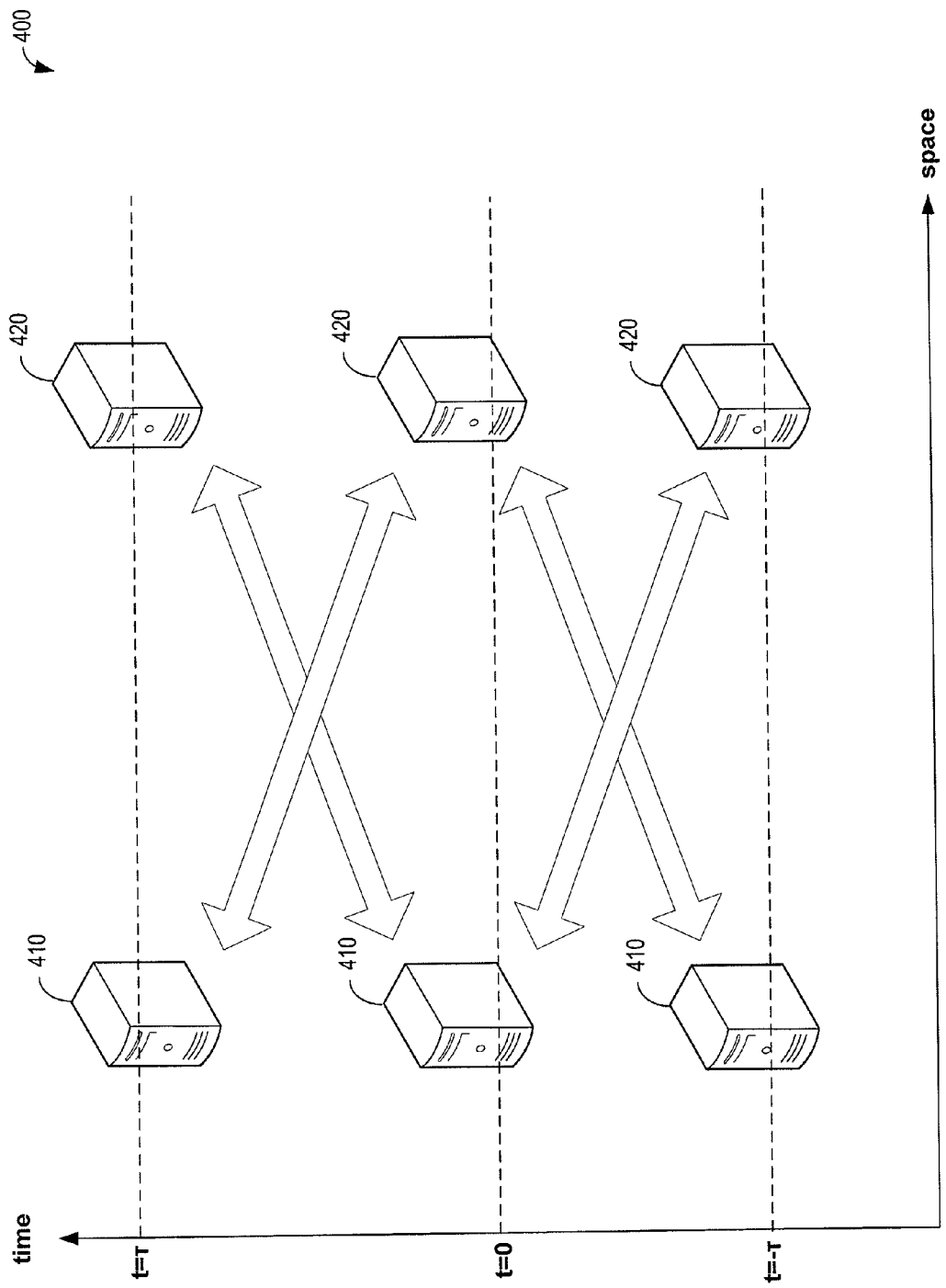
FIG. 4 is an illustrative space-time diagram of an exemplary distributed financial transaction executed using methods known in the prior art.

FIG. 4 shows a space-time diagram 400 of a conventional implementation of a distributed transaction comprising buying a first financial instrument at trading center 410 and selling a second financial instrument at trading center 420. In this example, the trade is controlled at trading center 410. For the purposes of this illustration it is assumed that the latency of information propagation between the two trading centers is $\tau$.

In FIG. 4, trading center 410 sends information about a first financial instrument (traded at trading center 410) to trading center 420 at time $t=-\tau$. Similarly, trading center 420 sends information about a second financial instrument (traded at trading center 420) to trading center 410 at time $t=-\tau$. The information may be any suitable information about the financial instruments that may be used to determine what trade should be made. For instance, the information may comprise information related to prices of the financial instruments (e.g., log-prices).

Trading center 420 may receive information sent from trading center 410 at time $t=0$. Similarly, trading center 410 may receive information sent from trading center 420 at time $t=0$. Based upon the received information, trading center 410 may execute a trade (e.g., to buy an amount of the first financial instrument) and may send trade instructions to trading center 420 (e.g., for an order to sell an amount of the second financial instrument). Trading center 420 may receive trade instructions from trading center 410 at time $t=\tau$ and may execute the trade specified by the instructions. Thus, the conventional approach requires time of at least $2\tau$ in order to execute the distributed transaction.

Figure 5:
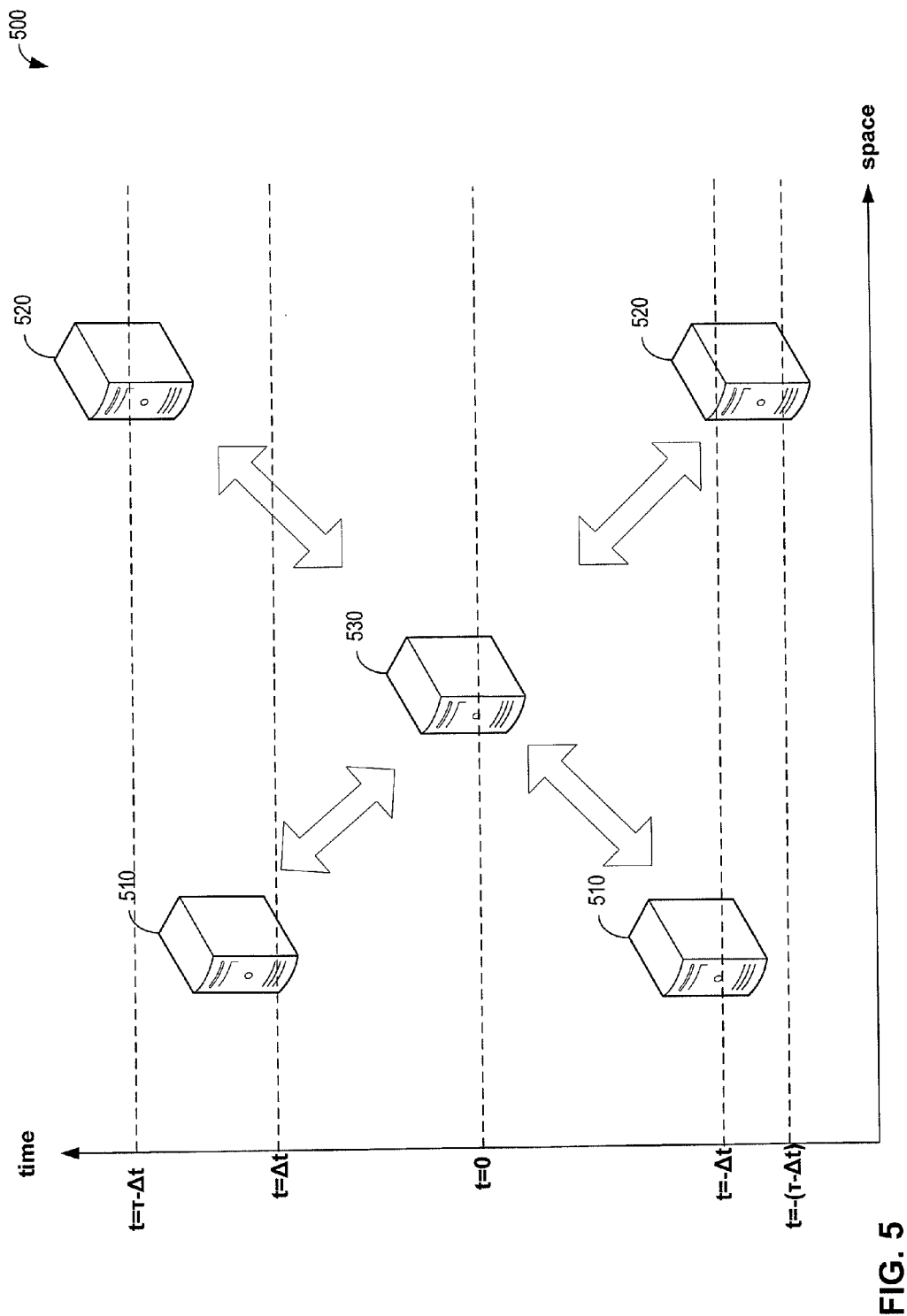
FIG. 5 is an illustrative space-time diagram of an exemplary distributed financial transaction executed in accordance with some embodiments of the present disclosure.

FIG. 5 shows a space-time diagram 500 of distributed transaction described with reference to FIG. 4, but executed on server 530 located at an intermediate location along the communication link between trading centers 510 and 520. For the purposes of this illustration, it is assumed that the latency of information propagation between the trading centers is $\tau$ (as before) and that the latency of information propagation between trading center 510 and server 530 is $\Delta t$. Accordingly, the latency of information propagation between server 530 and trading center 520 is $\tau - \Delta t$.

In FIG. 5, trading center 510 may send information about a first financial instrument at time $t=-\Delta t$ to server 530, and trading center 520 may send information about a second financial instrument at time $t=-(\tau-\Delta t)$ to server 530. The information may be any suitable information about the financial instruments that may be used by server 530 to determine what trade should be made. For instance, the information may comprise information related to prices of the financial instruments (e.g., log-prices).

Server 530 may receive both pieces of information at time $t=0$. Based upon the received information, server 530 may send trade instructions to trading center 510 (e.g., instructions for an order to buy an amount of the first financial instrument) and may send trade instructions to trading center 520 (e.g., instructions for an order to sell an amount of the second financial instrument).

Trading center 510 may receive trade instructions from server 530 at time $t=\Delta t$ and trading center 520 may receive trade instructions from server 530 at time $t=(\tau-\Delta t)$. Accordingly, in this case, the amount of time required to execute the distributed transaction is either $2\Delta t$ or $2(\tau-\Delta t)$, whichever is larger. Thus, the round trip delay may be as low as $\tau$ in this case. This improvement may be a significant improvement in the case of high-frequency trading.

Figure 6:
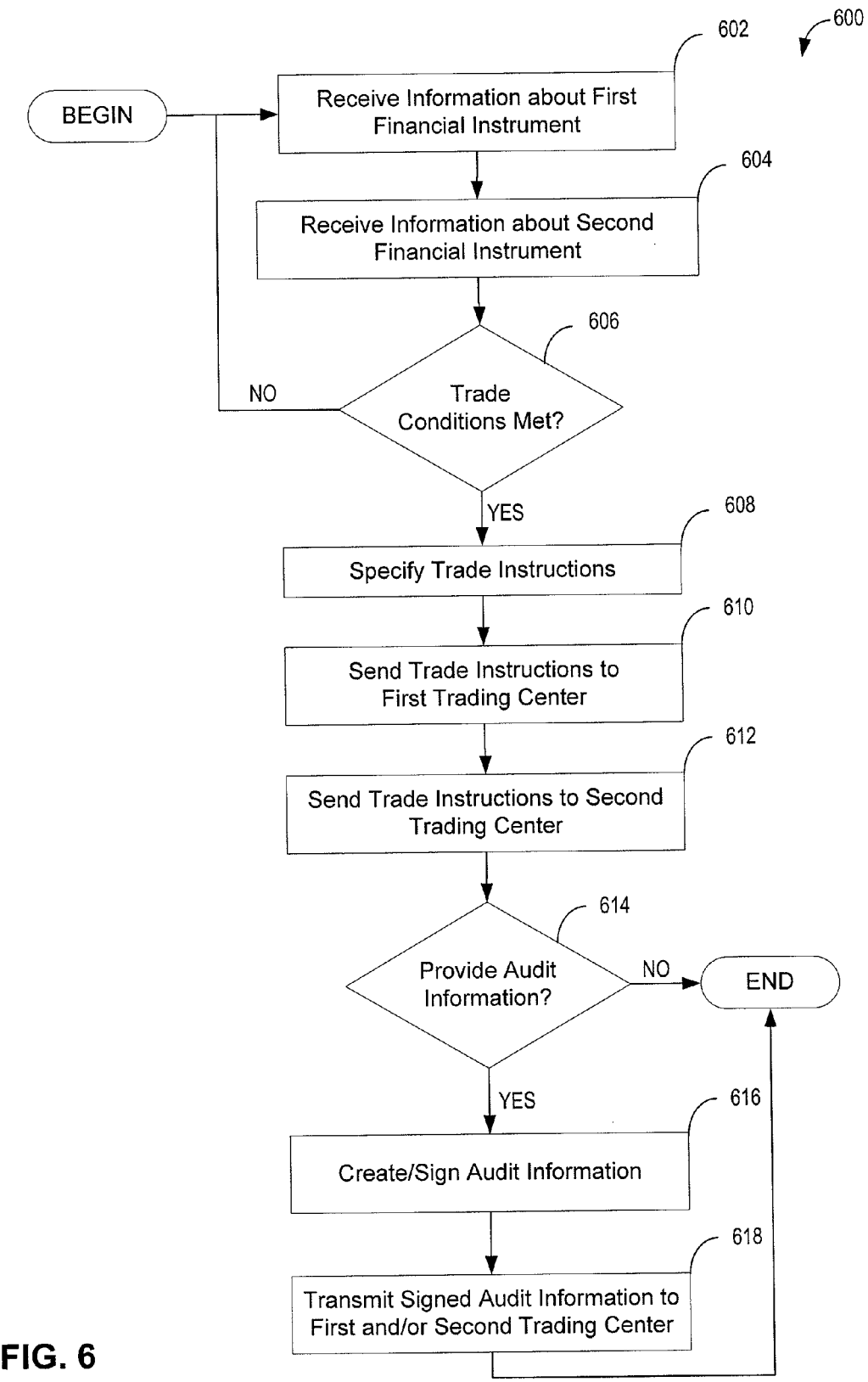
FIG. 6 is a flowchart of an illustrative process for executing a distributed financial transaction in accordance with some embodiments of the present disclosure.

FIG. 6 shows an illustrative process for controlling execution of a distributed trading strategy for trading financial instruments at multiple trading centers. Process 600 may be executed by a server operatively coupled to one or more communication links among the multiple trading centers and may control execution of the trading strategy by sending trade instructions to one or more trading centers. For example, process 600 may be executed by server 106 in system 100 and/or by server 306 in system 300.

Control over execution of a distributed trading strategy at multiple trading centers may comprise receiving information about one or more financial instruments traded at one of the multiple trading centers and/or sending trade instructions for trading these financial instruments. Trade instructions may be sent in response to trade conditions being met, which may be determined based on information about the financial instruments received from one or more of the multiple trading centers. Trade instructions sent to one trading center may be cryptographically signed and may include trade instructions sent to another trading center.

Process 600 begins when information about a first financial instrument is received in act 602 and information about a second financial instrument is received in act 604. The first and second financial instruments may be any suitable financial instruments that may be traded at a trading center and may be any of the financial instruments previously mentioned with reference to FIG. 1. The first and second financial instruments may be traded at a first trading center and a second trading center, respectively. Accordingly, information about the first financial instrument may be received from the first trading center and information about the second financial instrument may be received from the second trading center. In some instances, information about a financial instrument (e.g., first and/or second financial instrument) may be received from any trading center at which that financial instrument is traded. Though, in other instances, information about a financial instrument may be received from a trading center at which the financial instrument is not traded. Still, in other instances, information about a financial instrument may be obtained from any suitable entity, not necessarily a trading center, that may have information about the financial instrument.

Regardless of the source of information about the first financial instrument and the second financial instrument, received in acts 602 and 604, such information may comprise any information related to trading of the corresponding financial instrument. The information may comprise information related to past and current prices of the financial instrument and, for example, may comprise values indicative of historical prices and/or current prices of the financial instrument. For example, the information may comprise historical and/or current prices of the financial instrument. Additionally or alternatively, the information may comprise historical and/or current log-prices of the financial instrument. The information about a financial instrument may include any other function of the historical and/or current prices such as averages of prices and/or log prices over a (predetermined or automatically identified) time-interval.

In some embodiments, information about a financial instrument may comprise any quantity derived from historical and/or current prices of the financial instrument. For instance, it may include rates of return, information about trends in prices, and parameters of any models estimated from one or more historical and/or current prices. The information may also comprise transaction costs associated with trading the financial instrument, bid-ask spreads, and trading requirements (e.g., purchase minimums and/or margin requirements). Numerous other examples exist (e.g., analyst reports, econometric indicators, financial information about an entity related to a financial security such as the company issuing a stock/bond or country whose currency is being traded). Many other examples will be apparent to those skilled in the art.

After receiving information about the first and the second financial instrument, in acts 602 and 604, process 600 proceeds to decision block 606 at which it is determined whether trade conditions are met. The determination may be made based at least in part on the first and second information received in acts 602 and 604. If it is determined that trade conditions are met, the process proceeds to act 608, whereas if it is determined that trade conditions are not met, the process loops back to the beginning and acts 602, 604, and 606 may be repeated until it is determined that trade conditions are met.

Trade conditions may be any suitable conditions that indicate whether it is appropriate to execute a trade. The trade may be a trade that may be made as part of a trading strategy and the trade conditions may depend on the trading strategy. The trade conditions may comprise checking conditions for the first financial instrument, for the second financial instrument, or for both the first and the second financial instruments. For instance, a trading strategy may comprise buying the first financial instrument (e.g., stock "ABC") only when the price of the first financial instrument falls below a predetermined threshold. The threshold may depend on the historical prices and may be an average price of the financial security over a time period. In this case, the trade conditions may reflect this strategy and checking whether trade conditions are met may comprise checking for an indication that the price (or any suitable function of the price such as the log price) of the first financial instrument is below the predetermined threshold based on information about the first financial instrument received in act 602.

In another example, a trading strategy may comprise buying and selling financial instruments in accordance with a statistical arbitrage strategy. For instance, a trading strategy may be a pairs trading strategy and may comprise buying the first trade instrument and selling the second instrument (or vice versa). In this case, checking whether trade conditions are met may comprise checking when the price (or any suitable function of the price such as the log price) of the first financial instrument is above a first threshold and the price (or any suitable function of the price such as the log price) of the second financial instrument is below a second threshold. It should be appreciated that checking whether trade conditions are met may comprise checking conditions based on any suitable information received in acts 602 and 604 and is not limited to conditions based on prices and/or a function thereof. Additionally or alternatively, trade conditions may be based on information received prior to the beginning of the process (i.e., not just in acts 602 and 604).

Trade conditions may be specified by a user or may be automatically determined by a computer. For instance, trade conditions may be specified by user 112 described with respect to system 100 and server 106, which may be executing process 600, may be configured to check whether these conditions are met based on information received from trading center 102 and trading center 110.

If it is determined, in decision block 606, that trade conditions are met, trade instructions may be specified in act 608 of process 600. Trade instructions may comprise instructions for making trades at multiple trading centers. For example, trade instructions may comprise first trade instructions for executing a trade (e.g., involving the first financial instrument) at the first trading center and may also comprise second trade instructions for executing a trade (e.g., involving the second financial instrument) at the second trading center. For instance, in a pairs trading strategy, trade instructions may comprise instructions for buying an amount of the first financial instrument and instructions for selling an amount of the second financial instrument. Further, the amount of each financial instrument to buy/sell may depend on information about the first and/or second financial instruments received in acts 602 and 604 of process 600. Though, trade instructions are not limited to specifying pairs and/or statistical arbitrage trades and may be used to specify any distributed trading strategy comprising trading at multiple trading centers. As such, trade instructions may be in any suitable format and may comprise any information required to instruct each trading center to make any trades.

Once trade instructions are specified in act 608, trade instructions may be sent to multiple trading centers. For instance, if trade instructions comprise first trade instructions for trading a first financial instrument at the first trading center, first trade instructions may be sent to first trading center in act 610 of process 600. Similarly, if trade instructions comprise second trade instructions for trading a second financial instrument at the second instrument, second trade instructions may be sent to second trading center in act 612 of process 600.

In acts 610 and 612, trade instructions may be sent using a communication link between the first trading center and the second trading center. For example, if process 600 is executing on server 106 of system 100, first trade instructions may be sent along communication link 104 to trading center 102 and second trade instructions may be sent along communication link 104 to trading center 110. As another example, if process 600 is executing on server 306 of system 300, and server 306 selects trading centers 302 and 310, then first trade instructions may be sent along communication link 312 to trading center 302 and second trade instructions may be sent along communication link 312 to trading center 310. Though, if server 306 selects trading centers 304 and 308, then first trade instructions may be sent along communication link 314 to trading center 304 and second trading instructions may be sent along communication link 314 to trading center 308.

In conventional trading, positions that at least partially offset one other may incur reduced margin requirements (i.e., how much collateral needs to be deposited in order to make a trade). For instance, margin requirements may be reduced for trades that comprise taking both a long and a short position; mechanisms for taking long and short positions are known in the art. The inventors have recognized that when such trades occur at a single trading center, it may be easy to verify that a trade comprises taking both a long position and a short position, but this may not be easy to verify when such a trade occurs at multiple geographically-separated trading centers. The inventors have appreciated that in a distributing trading scenario, a dishonest trader may falsely claim to implement a strategy for which margin requirements may be reduced. For example, a trader using server 106 of system 100 may send first trade instructions to trading center 102 to take a long position and falsely claim that he also sent trade instructions to the second trading center to take a short position, in order to get the benefit of reduced margin requirements.

The inventors have recognized and appreciated that this problem may be averted if audit information for the first trade could be provided. Audit information may comprise a guarantee of the second trade. For instance, in the context of process 600, audit information comprising a guarantee of the second trade may be provided to the first trading center.

Accordingly, after first and second trade instructions are sent to the first and second trading centers in acts 610 and 612, process 600 proceeds to decision block 614 during which it is determined whether audit information should be provided to the first trading center, the second trading center or both the first and second trading centers.

The determination whether to provide audit information to the first and/or second trading center may be made based on any suitable criteria. For example, if first trade instructions sent to the first trading center rely on reduced margin requirements, it may be determined that audit information should be provided to the first trading center. Though, this determination may be made in any suitable way as the way in which this determination is made is not a limitation of the present invention.

If it is determined, in act 614, that audit information for the first and/or second trading center should not be provided, process 600 completes.

On the other hand, if it is determined, in act 614, that audit information for the first and/or second trading center should be provided, such audit information may be created and cryptographically signed in act 616. Audit information for the first trading center may comprise a guarantee that second trade instructions specify a trade, at the second trading center, that creates an offset position to the position created by the trade at the first trading center specified by the first trade instructions. For instance, audit information for the first trading center may comprise second trade instructions. Similarly, audit information for the second trading center may comprise a guarantee that first trade instructions specify a trade, at the first trading center, that may create an offset position to the position created by the trade at the second trading center specified by the second trade instructions. For instance, audit information for the second trading center may comprise first trade instructions.

Audit information may be cryptographically signed using any suitable technique as known in the art. For instance, audit information may be signed using any asymmetric cryptographic technique.

After audit information is created in act 616, it may be transmitted to the first and/or the second trading center in act 618 of the process 600. Audit information may be transmitted to the trading center(s) in the same way that trade instructions are transmitted to the trading center (e.g., using a communication link between the first and second trading centers). After audit instructions are sent to the first and/or second trading center, process 600 completes.

It should be recognized that process 600 is an illustrative process and that various modifications of process 600 are possible. For example, though process 600 was described with respect to a distributed trading strategy in which two financial instruments are traded, process 600 is not limited in this respect and may be applied to trading more than two financial instruments. Moreover, though process 600 was described with respect to a distributed trade using two trading centers (first and second trading center), the process may be adapted to control execution of a trade distributed across more than two trading centers. As another example, audit information may be sent concurrently with the first trade instructions and/or the second trade instructions instead of being sent after the first and the second trade instructions.

Process 600 may be executed at a server located at an intermediate location between the first and second trading center. For instance, as described with reference to FIG. 1 and FIG. 3, the server may be located at a predetermined location along a communication link between a pair of trading centers. Thus, the server at the predetermined location may control execution of a trading strategy and may send instructions to the first trading center and the second trading center to trade the first and the second financial instrument. The location of the server may be determined prior to execution of process 600 and may be determined based on a number of factors including properties of the communication link between the first trading center and the second trading center, characteristics of the first financial instrument and the second financial instrument, and the trading strategy.

Figure 7:
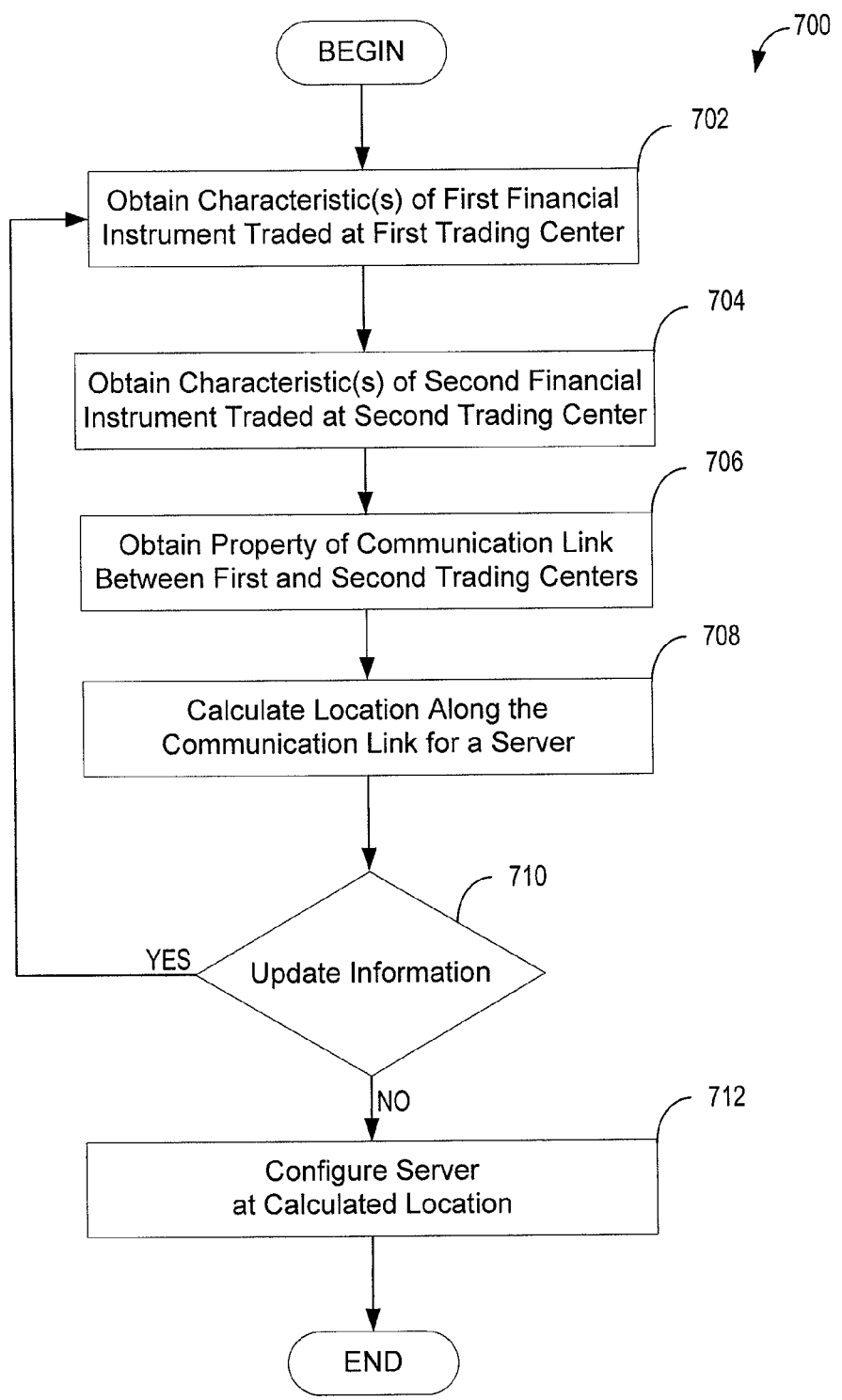
FIG. 7 is a flowchart of an illustrative process for calculating a location for a server in accordance with some embodiments of the present disclosure.

FIG. 7 is a flowchart of an illustrative process 700 for calculating a location to place the server. Process 700 may be executed using a processor and may be performed by or on behalf of any entity that may wish to install and/or configure a server to control execution of a distributed trade at some location along a communication link between trading centers. The entity may be an infrastructure provider such as network provider, a trading platform provider, a financial institution, operator of a trading center. Though any entity may perform process 700, as the invention is not limited in this respect.

Process 700 begins when one or more characteristics of a first financial instrument traded at a first trading center, and one or more characteristics of a second financial instrument, traded at a second trading center, are obtained in acts 702 and 704, respectively.

Characteristics of the first and second financial instruments may be obtained from any suitable source. In some instances, they may be obtained from any trading center at which these instruments are traded (e.g., the first and second trading center). In other instances, they may be derived from any historical data (e.g., historical prices) of the financial instrument using any suitable technique or from any other information related to the financial instrument.

In some embodiments, characteristics of the first financial instrument, obtained in act 702, may be the same as the characteristics of the second financial instrument, obtained in act 704. Though, in other embodiments, characteristics of the first financial instrument, obtained in act 702, may be different from the characteristics of the second financial instrument, obtained in act 704, as the invention is not limited in this respect.

Regardless of how the characteristics of the first and second financial instrument are obtained, each obtained characteristic may be any characteristic indicative of the behavior of the financial instrument. The characteristic may be any characteristic indicative of the behavior of the prices of the financial instrument and may be any function of the historical, current, and future predicted prices of the financial instrument. For instance, a characteristic may be a reversion rate of the financial instrument or the volatility of the financial instrument.

A reversion rate of a financial instrument may be indicative of the rate at which the prices of a financial instrument (or a function thereof) revert to exhibiting a trend from which they may have deviated. The trend may be any of numerous trends as known in the art—the trend may be a constant such as an average of the instrument's prices (or a function thereof) calculated over a period of time. In this case, the reversion rate is referred to as the mean reversion rate, which is the rate at which the prices of the instrument (or a function thereof) revert to the average price (or a corresponding function thereof). The trend may be any polynomial trend such as a linear trend or a quadratic trend. In some instances, the trend may not be a deterministic trend and may be a stochastic trend such as a random walk or a stationary stochastic process obeying certain characteristics.

It should be recognized that reversion rate and volatility are only examples of characteristics that may be used and that many other characteristics of financial instruments may be employed. An example characteristic of a financial instrument may be a statistic of the instrument's prices over a time period and may be the average of the prices, standard deviation of the prices, and kurtosis of the prices. Another example of a characteristic of a financial instrument may be a statistic of the instrument's returns (e.g., any moment of the returns). Another example may be a trend in the instrument's prices (or a function of the prices). Another example of a characteristic of one financial instrument (e.g., derivative) may be a characteristic of another instrument related to the instrument (e.g., the financial instrument on which the derivative is based).

Yet another example of a characteristic may be a characteristic that is a function of both the first and the second financial instruments. In this case, the characteristic may be indicative of the relationship between the first and second financial instruments. For instance, if the first and second financial instruments are cointegrated, the characteristic may be the cointegrating vector. If, the first and second financial instruments are correlated, then the characteristic may be indicative of a degree of correlation (e.g., a cross-correlation coefficient) between the two instruments.

Process 700 next continues in act 706, when a property of the communication link between the first trading center and the second trading center is obtained. The property may be any property indicative of the latency of propagation of information along the communication link. For instance, the property may be the latency of propagation of an electromagnetic signal through the communication link. In the case that the communication link comprises fiber optic cable, the property of the communication link may be the latency of propagation of light through the fiber-optic cable or may be the index of refraction of the fiber-optic cable. In the case that the communication link comprises any physical link (e.g., another type of cable) or any equipment (e.g., repeaters, amplifiers, relays, satellites, radios, etc.), the property may be any property related to the link or the equipment. The property may also be any property indicative of the usage of a communication link. For instance, the property may be related to the level of network congestion.

The property may be obtained in any suitable manner. In some cases the property may be known in advance (e.g., index of refraction of a fiber-optic cable), while in other cases the property may be measured. The property may be measured and may be obtained either passively or actively. For instance, passive measurements of communications along the communication link may be used to determine the property. Additionally or alternatively, the communication link may be actively probed (e.g., by sending out test messages/packets from a computer connected to the communication link and calculating the time required for a response to come back to the computer).

After one or more characteristics of each of the first and second financial instruments and at least one property of the communication link are obtained, the location to place the server for controlling a distributed trading strategy may be determined in act 708 of process 700. The location may be determined by using a criterion that depends on at least a portion of this information. In some instances, the criterion may depend both on a property of the communication link and/or a characteristic of one or both of the first and second financial instruments. The criterion may be any function of the values of the characteristics and/or property of the communication link and may associate a score with each potential location of the server along the communication link.

The location may be computed as the location along the communication link associated with the highest score computed by using the above-mentioned criterion. Though, in some embodiments, the location may not be the location associated with the highest score. For instance, in some cases it may be possible to place a server only at one of a set of predetermined locations along the communication link between the first and the second trading center. In this case, the location may be selected from the set of location based on the scores associated with these locations, and may be selected as the location with the highest score.

For example, the characteristics of the first and second financial instruments may be reversion rates (e.g., mean-reversion rates) associated to each of the instruments, the property may be the latency of propagation of information from the first trading center to the second trading center, and the trading strategy may be a pairs trading strategy (e.g., buy an amount of the first financial instrument at the first trading center and sell an amount of the second financial instrument at the second trading center). The criterion may be a function of the reversion rates and the latency of propagation and may indicate a time to execute a trade according to the pairs trading strategy.

In this example, the criterion may be used to compute a score for each time to enter the pairs trading strategy (e.g., when a ratio of prices (or a ratio of some function of the prices) of the financial instruments deviates from a historical value). The time associated with the highest score may be the time to enter into the pairs trade. In turn, this time may be used together with the latency of information propagation to determine the location for the server. Though it should be recognized, that this example is merely illustrative and that any or all elements of this example, including the characteristics of the financial instruments, the property of the communication link, the criterion, and the trading strategy, may be varied. Any suitable approach to determining the location of a server based on characteristics of the first and second financial instruments and property of the communication link may be used.

In one illustrative example, the location of the server may be computed as described below. Consider the situation in which the log-prices of a first financial instrument traded at a first trading center and a second financial instrument traded at a second trading center are modeled by decoupled Vasicek processes according to:

$$dx(t) = -a_x x(t) dt + \sigma_x dV(t),$$

$$dy(t) = a_y y(t) dt + \sigma_y dW(t),$$

In the above expression, $a_x$ and $a_y$ may be values indicative of a speed of reversion of the first and second financial instruments, respectively. Variables $\sigma_x$ and $\sigma_y$ may be values indicative of the instantaneous volatilities of the first and second financial instruments, respectively. Though, it should be appreciated, that the above decoupled Vasicek process model may be used to model the temporal evolution of any trading signal associated with the first and second financial instruments and is not limited to modeling the temporal evolution of log-prices as in this illustrative example. For instance, prices or any suitable function of the prices may be modeled using this model.

Now suppose that the latency of propagation of information between the first trading center and the second trading center is given by $c\tau$, where c is the speed of propagation through the communication link between the first and second trading centers. We wish to determine a location for a server to be placed along the communication link between the first trading center and the second trading center. As previously discussed, this location may be determined based on characteristics of the first and second financial instrument (e.g., the reversion rates $a_x$ and $a_y$), the latency of propagation between the first trading center and the second trading center (which depends on $\tau$), and the trading strategy (e.g., statistical arbitrage trade, pairs trade, etc.)

In the case of a pairs trade using the first financial instrument and the second financial instrument, it is known in the art that a pairs trade may be triggered when the ratio between the log-prices (or other trading signal) of the financial instruments is large. Accordingly, a location may be chosen in order to maximize this ratio. Though, many other criteria for selecting a location may be possible and may be based on a strategy that would maximize profit for that strategy.

Assume, without loss of generality, that $x(-\Delta t) > y(-(\tau - \Delta t))$, such that the objective is to find a value of $\Delta t$ to maximize the quantity:

$$e^{R(\Delta t)} \equiv e^{x(\Delta t)} / e^{y(\tau - \Delta t)}$$

Then the server will be located along the communication link at a location represented by $c^{\Delta t}$, which indicates the latency of propagation of information from the first trading center to the server. The solution may be obtained as follows. From the perspective of the server at t=0, the Vasicek expectation values of x(t) and y(t) will decay exponentially back to the mean from instantaneously known values $x(-\Delta t)$, $y(-(\tau - \Delta t))$:

$$\langle R(\Delta t) \rangle = x(-\Delta t) e^{-2a_x \Delta t} - y|(-(\tau - \Delta t)) e^{-2a_y(\tau - \Delta t)}$$

The above expected security ratio will reach an extremum when $\Delta t$ satisfies:

$$0 = \frac{d\langle R(\Delta t)\rangle}{d\Delta t} = -e^{-2a_x \Delta t}(\dot{X} + 2a_x X) | -e^{-2a_y(\tau - \Delta t)}(\dot{Y} + 2a_y Y)$$

where $$X \equiv x(-\Delta t), \dot{X} \equiv \dot{x}(-\Delta t), Y \equiv y(-(\tau - \Delta t)) \text{ and } \dot{Y} \equiv \dot{y}(-(\tau - \Delta t)).$$

Solving for the intermediate position, two solution cases depending on the instantaneous behavior of the first and second financial instruments results. The special case is given by:

$$\dot{X} + 2a_x X = 0 = \dot{Y} + 2a_y Y$$

and the general case is given by:

$$\frac{\Delta t}{\tau} = \frac{a_y}{a_x + a_y} + \frac{1}{2(a_x + a_y)\tau} \ln\left[-\frac{\dot{X} + 2a_x X}{\dot{Y} + 2a_y Y}\right]$$

To test for concavity in the general case, calculate:

$$0 > \frac{d^2\langle R(\Delta t)\rangle}{d\Delta t^2} = e^{-2a_x \Delta t}[2a_x(\dot{X} + 2a_x X) + \ddot{X} + 2a_x \dot{X}] - e^{-2a_y(\tau - \Delta t)}[2a_y(\dot{Y} + 2a_y Y) + \ddot{Y} + 2a_y \dot{Y}],$$

where: $\ddot{X} \equiv \ddot{x}(-\Delta t)$ and $\ddot{Y} \equiv \ddot{y}(-(\tau - \Delta t))$. Accordingly, it follows that there will be a local maximum at $\Delta t$ when the following inequality is satisfied:

$$4a_x^2 X + 4a_x \dot{X} + \ddot{X} < 0 < 4a_y^2 Y + 4a_y \dot{Y} + \ddot{Y}.$$

These conditions may be satisfied when fluctuations in the log prices of the first and second financial instrument are sufficiently sharp. For instance, fluctuations whose characteristic frequency f lies in the range:

$$\frac{\max(a_x, a_y)}{\pi} < f < \frac{\tau^{-1}}{\pi\sqrt{2}}.$$

Such fluctuations may be common in conventional high-frequency trading. For instance, for maximally distant points on Earth $\tau \approx 67$ ms, and for trading centers $\tau$ may be even smaller (e.g., $\tau \approx 1.1$ ms for trading centers located in London and Paris). In this illustrative example, these latencies imply lower bounds on the characteristic time between "exploitable" fluctuations $f^{-1}$, of approximately 300 ms for maximally distant trading centers, approximately 5 ms for trading centers located in London and Paris, and lower for multiple markets within one city. In contrast, reversion times (which determine approximate values of $a_x^{-1}$ and $a_y^{-1}$) are typically longer. Consequently, the range given by the above equation is a wide range and may include the typical time scales exploited in high-frequency trading (e.g., 10 ms-10 s range).

It should be noted that under the simplifying assumption that the fluctuations $$\left(\left|\frac{\dot{X}}{X}\right| \sim 2\pi f \gg 2\max(a_x, a_y)\right]:\right\},$$

are high-frequency fluctuations the solution for the general case reduces to:

$$\Delta t = \tau a_y/(a_x+a_y).$$

In this case, the location of the server may be determined by weighting the latency of information propagation through the communication link by a value derived from the characteristic of the first financial instrument and the characteristic of the second financial instrument. In this illustrative example, the value may be given by the ratio of the reversion speed of the second financial instrument and the sum of the reversion rates of the first financial instrument and the second financial instrument.

It should be recognized that the above-illustrated calculations for the case of log-prices of two financial instruments were merely illustrative and that analogous calculations may be made in any of numerous other cases. For instance, similar calculations may be made for any function of the prices of the two financial instruments and by using models other than the Vasicek model to model the temporal behavior of each financial instrument. In a case, when a trading strategy is based on volatility of the financial instruments, Ornstein-Uhlenbeck processes and their refinements may be used to model stochastic volatility.

After the location for the server is calculated in at 708 of process 700, the process proceeds to decision block 710 in which it may be determined that at least a portion of the information about the financial instruments and/or the communication link may be updated. For instance, the characteristics of the financial instruments may be updated and/or the property of the communication link may be updated. This determination may be made in any suitable way. For instance, it may be determined that information should be updated if it is detected that utilization of the communication link has changed. Though the manner in which this determination is made is not a limiting aspect of the present invention.

If it is determined in decision block 710 that at least a portion of the information should be updated, process 700 loops back to act 702 and acts 702-708 are repeated. Thus, in acts 702-706 updated information related to the first and second financial instruments and the communication link may be obtained and the location of the server may be recalculated based on the updated information in act 708.

If it is determined that the information need not be updated, process 700 proceeds to act 712 in which the server is configured to communicate with the first trading center and the second trading center. The server may be installed and operatively coupled to the communication link at the calculated location. The server may be installed at or near the calculated location such that the latency of information propagation between the server and the first trading center is substantially the latency of information propagation between the calculated location and the first trading center.

In some embodiments, the server may already be physically installed at the location calculated in act 708. This may be the case, for example, when one of a predetermined set of locations is selected and each location in the set corresponds to a location which has a server already installed). Alternatively, the server may need to be physically installed at the calculated location. In either case, the server may be configured to communicate with the first and second trading center by using the communication link. The server may be configured manually (e.g., by a network technician) or may be configured automatically by a computer. After the server is configured for communication with the first and second trading center, process 700 completes. The configured server may now be used to control execution of distributed trades. For instance, the configured server may be used to execute process 600.

It should be recognized that process 700 is an illustrative process and that many modifications of process 700 are possible. For example, though only one property of the communication link was obtained in act 706, process 700 is not so limited and any number of properties of the communication link may be obtained and used to calculate the location of the server. Moreover, though process 700 was described with respect to a two trading centers (first and second trading center) and two financial instruments, the process may be easily adapted calculate the location of the server based on properties of communication links among more than two trading centers and based on characteristics of more than two financial instruments.

When a location of a server to control the execution of a distributed trade is fixed, the above-described techniques may be used to select trading centers on which to execute the distributed trade. In some embodiments, the server may be configured to select a pair of trading centers among a set of trading centers and, subsequently, may control the execution of a distributed trade on the selected trading centers.

Figure 8:
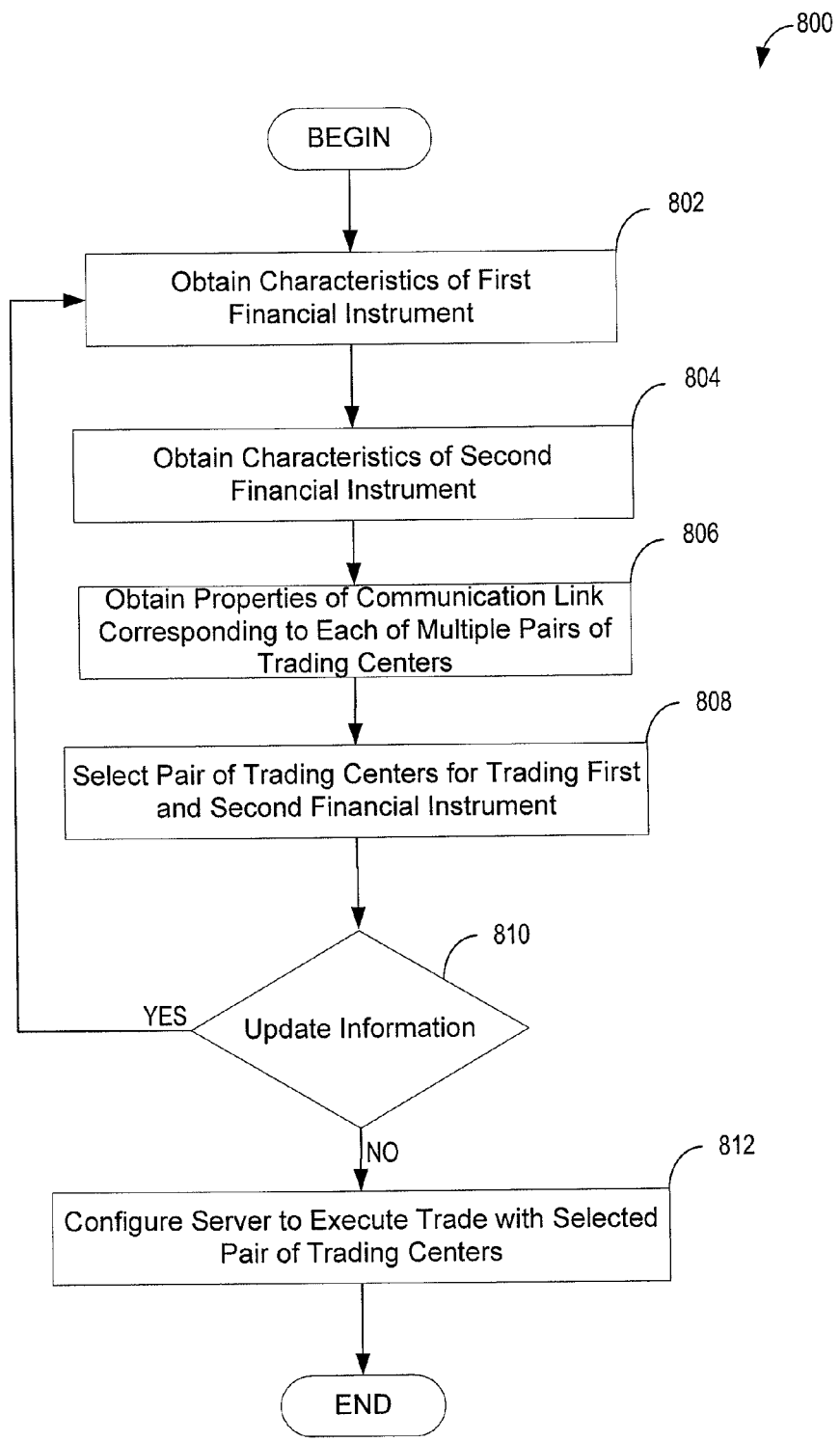
FIG. 8 is a flowchart of an illustrative process for selecting trading centers to execute a distributed financial transaction in accordance with some embodiments of the present disclosure.

FIG. 8 is a flowchart of an illustrative process 800 for calculating a pair of trading centers for trading a first and a second financial instrument. Process 800 may be executed using a processor and may be executed at a server located at an intermediate location along a communication link between one trading center and another trading center. Additionally, the server may also be located at an intermediate location along another communication link between a pair of trading centers. For instance, illustrative process 800 may execute on server 306 of system 300.

Process 800 begins when one or more characteristics of a first financial instrument traded at a first trading center, and one or more characteristics of a second financial instrument, traded at a second trading center, are obtained in acts 802 and 804, respectively. Characteristics of the first and second financial instruments may be obtained from any suitable source and may be any suitable characteristics. For example, characteristics of the first and second financial instruments may be obtained from any trading center at which these instruments are traded, derived from historical data and/or obtained from a third party. For example, the obtained characteristics may be any of the characteristics described with reference to FIG. 7, and each obtained characteristic may be any characteristic indicative of the behavior of the financial instrument.

Process 800 next continues in act 806, when one or more properties of one or more communication links may be obtained. Each communication link may be a communication link between a pair of trading centers. Each communication link may be a link to which a server to control execution of a distributed trading strategy is coupled. The server may be operatively coupled to the link at an intermediate location between the trading centers connected by the link. For example, properties of communication links 312 and 314 illustrated in FIG. 3 may be obtained, in act 806. It should be recognized that properties need not be obtained for every communication link to which a server may be coupled and may be obtained only for some of the communication links. For example, one or more properties associated with communication link 314 may be obtained, but no properties associated with communication link 312 may be obtained.

The one or more properties obtained in act 806 may be any suitable properties. For instance, a property indicative of the latency of propagation of information along the communication link may be obtained. Each obtained property may also be any property described with reference to FIG. 7 and may be obtained from any suitable source such as any of the sources described with reference to FIG. 7.

After one or more characteristics of each of the first and second financial instruments and one or more properties of one or more communication links are obtained, a pair of trading centers for trading the first and second financial instrument may be selected. The pair of trading centers may comprise a trading center at which the first financial instrument is traded and a trading center at which the second financial instrument is traded. Though, in some instances, the first and second financial instruments may be traded together on one or both of the trading centers.

The selection may be made by using a criterion that depends on the obtained characteristics of the financial instruments, obtained property or properties of the one or more communication links. The criterion may also depend on the location of the server used to control the execution of a distributed trade involving the first and second financial instruments. For instance, the criterion may depend on the location of server 306 described with reference to FIG. 3. In particular, since server 306 is operatively coupled to communication links 312 and 314 at (or near) locations 316 and 318, respectively, the criterion may depend on locations 316 and 318.

In some embodiments, the trading centers may be selected by evaluating a criterion for every pair of considered trading centers. The value of the criterion may be used to select one of the pairs of considered trading centers. For instance, the criterion may be used to evaluate trading centers 302 and 310, and trading centers 304 and 308. The values computed for each of these two pairs may be used to select one of these two pairs of trading centers.

In some embodiments, a server location may be computed for each considered pair of trading centers, and the pair associated with the location closest to the location of the server (e.g., server 306) may be selected. The location for a server may be computed using the information obtained in acts 802-806 of process 800 and may be done in accordance with process 700 described with reference to FIG. 7.

Process 700 may be used to compute a location of a first server along a first communication link between a first pair of trading centers and a location of a second server along a second communication link between a second pair of trading centers. The computed locations may be used to determine whether the first or the second pair of trading centers should be selected. For instance, the first pair of trading centers may be selected if is determined that the distance between the first server location and the location of the server controlling the execution of a distributed trade (e.g., server 306) is small than the distance between the second server location and the location of the server. Any suitable distance measure may be used.

For instance, process 700 may be used to compute a location for a first server along communication link 312 and a location for a second server along communication 314. These locations may be computed based on characteristics of the first and second financial instruments (e.g., mean-reversion rates) and based on properties of communication links 312 and 314 (e.g., latency of propagation of information along the link). Then, trading centers 302 and 310 may be selected, in act 808, if it is determined that the distance between computed location of the first server and location 316 is smaller than the distance between the computed location of the second server and location 318.

After a pair of trading centers is selected in act 808 of process 800, the process proceeds to decision block 810 in which it may be determined that at least a portion of the information about the financial instruments and/or the communication link(s) may be updated. As previously mentioned, characteristics of the financial instruments may be updated and/or the properties of the communication link(s) may be updated. The manner in which this determination is made is not a limiting aspect of the present invention.

If it is determined in decision block 810 that at least a portion of the information should be updated, process 800 loops back to act 802 and acts 802-808 are repeated. Thus, in acts 802-806 updated information related to the first and second financial instruments and the communication link may be obtained and a different pair of trading centers may be selected based on the updated information in act 808.

If it is determined that the information need not be updated, process 800 proceeds to act 812, in which the server (e.g., server 306) is configured to communicate with the trading centers in the selected pair. At this point, the configured server may be used to control the execution of a distributed trading strategy using trading centers in the selected pair of trading centers. For example, the configured server may be used to execute process 600.

It should be recognized that process 800 is an illustrative process and that many modifications of process 800 are possible. Though process 800 was described with respect to selecting a pair of trading centers and two financial instruments, the process may be adapted to select any number of trading centers from a set of trading centers and may select trading centers based on characteristics any suitable number of financial instruments.

Though we described with respect to financial applications, embodiments of the present disclosure may be applied to a wide variety of problems in other domains. Techniques disclosed herein may be applied to any setting which comprises time-sensitive calculations performed at geographically distributed locations. For instance, techniques described herein may be adapted for video-teleconferencing, virtual reality, and networking applications, to name only a few.

The above-described embodiments of the present invention can be implemented in any of numerous ways. For example, the embodiments may be implemented using hardware, software or a combination thereof. When implemented in software, the software code may be executed on any suitable processor or collection of processors, whether provided in a single computer or distributed among multiple computers.

It should be appreciated that a computer may be embodied in any of numerous forms, such as a rack-mounted computer, a desktop computer, a laptop computer, or a tablet computer. Additionally, a computer may be embodied in a device not generally regarded as a computer, but with suitable processing capabilities, including a Personal Digital Assistant (PDA), a smart phone or any other suitable portable or fixed electronic device.

Also, a computer may have one or more input and output devices. These devices may be used, among other things, to present a user interface. Examples of output devices that may be used to provide a user interface include printers or display screens for visual presentation of output, and speakers or other sound generating devices for audible presentation of output. Examples of input devices that may be used for a user interface include keyboards, microphones, and pointing devices, such as mice, touch pads, and digitizing tablets.

Such computers may be interconnected by one or more networks in any suitable form, including a local area network (LAN) or a wide area network (WAN), such as an enterprise network, an intelligent network (IN) or the Internet. Such networks may be based on any suitable technology and may operate according to any suitable protocol and may include wireless networks, wired networks, and/or fiber optic networks.

Figure 9:
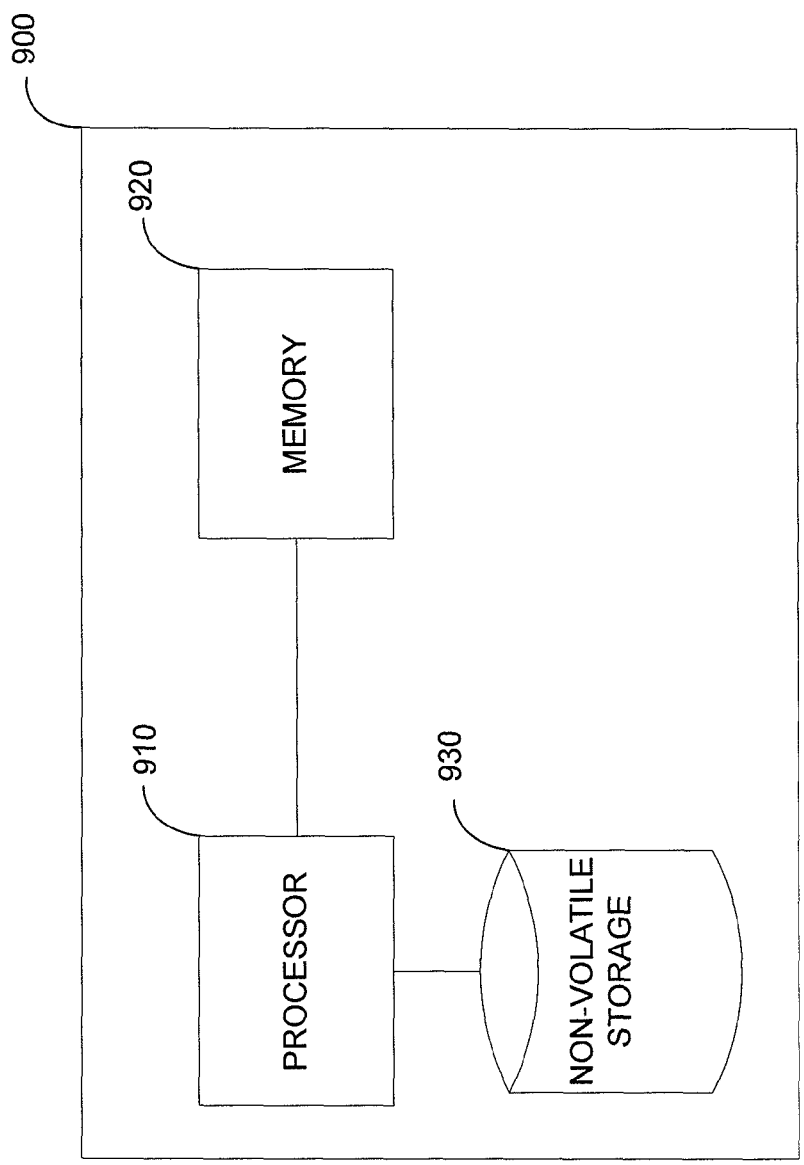
FIG. 9 is a block diagram generally illustrating an example of a computer system that may be used in implementing aspects of the present disclosure.

An illustrative implementation of a computer system 900 that may be used in connection with any of the embodiments of the invention described herein is shown in FIG. 9. The computer system 900 may include one or more processors 910 and one or more non-transitory computer-readable storage media (e.g., memory 1120 and one or more non-volatile storage media 930). The processor 910 may control writing data to and reading data from the memory 920 and the non-volatile storage device 930 in any suitable manner, as the aspects of the invention described herein are not limited in this respect. To perform any of the functionality described herein, the processor 910 may execute one or more instructions stored in one or more computer-readable storage media (e.g., the memory 920), which may serve as non-transitory computer-readable storage media storing instructions for execution by the processor 910.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A system for identifying a physical location along a communication link between a first trading center and a second trading center at which to couple to the communication link a server for sending trading instructions to the first trading center and/or the second trading center, the system comprising:
   at least one processor configured to:
      obtain a property of the communication link; and
      identify the physical location at which to physically couple the server to the communication link at least in part by calculating a location based at least in part on the obtained property of the communication link and at least one characteristic of a first financial instrument traded at the first trading center,
   wherein the at least one characteristic of the first financial instrument includes a rate at which a value depending on a price of the first financial instrument moves to its long term trend over a predetermined period of time.

2. The system of claim 1, wherein the at least one processor is configured to calculate the location based at least in part on the at least one of characteristic of the first financial instrument traded at the first trading center and at least one characteristic of a second financial instrument traded at the second trading center.

3. The system of claim 1, wherein the first financial instrument is a financial instrument selected from the group consisting of an equity, a derivative, a fixed-income product, and a currency.

4. The system of claim 1, wherein the at least one characteristic of the first financial instrument depends on historical prices of the first financial instrument.

5. The system of claim 1, wherein the property of the communication link is a latency of electromagnetic signal propagation through the communication link.

6. The system of claim 1, wherein the server coupled to the communication link at the identified physical location is configured to:
   send first trade instructions for trading the first financial instrument to the first trading center; and
   send second trade instructions for trading a second financial instrument to the second trading center.

7. The system of claim 6, wherein the server coupled to the communication link at the identified physical location is further configured to:
   determine whether trade conditions are met based at least in part on information associated with the first financial instrument, and
   send the first trade instructions to the first trading center and the second trade instructions to the second trading center, if it is determined that the trade conditions are met.

8. The system of claim 6, wherein the first trade instructions and the second trade instructions are instructions for a statistical arbitrage trade.

9. The system of claim 6, wherein the first trade instructions and the second trade instructions are instructions for a pairs trade.

10. The system of claim 6, wherein the server coupled to the communication link at the identified physical location is further configured to send signed first trade instructions and signed second trade instructions to the first trading center.

11. A method for identifying a physical location along a communication link between a first trading center and a second trading center at which to couple to the communication link a server for sending trading instructions to the first trading center and/or the second trading center, the method comprising:
   obtaining a property of the communication link; and
   identifying the physical location at which to physically couple the server to the communication link, wherein the identifying comprises calculating, with at least one processor, a location based at least in part on the obtained property of the communication link and at least one characteristic of a first financial instrument traded at the first trading center,
   wherein the at least one characteristic of the first financial instrument includes a rate at which a value depending on a price of the first financial instrument moves to its long term trend over a predetermined period of time.

12. The method of claim 11, further comprising:
   connecting the server to the communication link at or near the calculated location.

13. The method of claim 11, wherein calculating the location for the server further comprises calculating the location based on the at least one characteristic of the first financial instrument traded at the first trading center and at least one characteristic of a second financial instrument traded at the second trading center.

14. The method of claim 13, wherein calculating the location comprises weighting a value indicative of the property of the communication link by a value derived from the at least one characteristic of the first financial instrument and the at least one characteristic of the second financial instrument.

15. The method of claim 11, wherein the first trading center is an exchange or an over-the-counter market.

16. The method of claim 11, wherein the communication link comprises fiber-optic cable and the property of the communication link is a latency of propagation of light through the fiber-optic cable.

17. At least one non-transitory computer-readable storage medium encoded with processor-executable instructions that, when executed by at least one processor, cause the at least one processor to perform a method for identifying a physical location along a communication link between a first trading center and a second trading center at which to couple to the communication link a server for sending trading instructions to the first trading center and/or the second trading center, the method comprising:

obtaining a property of the communication link; and identifying the physical location at which to physically couple the server to the communication link, wherein the identifying comprises calculating a location based at least in part on the obtained property of the communication link and at least one a characteristic of a first financial instrument traded at the first trading center, wherein the at least one characteristic of the first financial instrument includes a rate at which a value depending on a price of the first financial instrument moves to its long term trend over a predetermined period of time.

18. The at least one non-transitory computer-readable storage medium of claim 17, wherein the method further comprises calculating the location based at least in part on the at least one characteristic of the first financial instrument and at least one characteristic of a second financial instrument traded at the second trading center.

19. The at least one non-transitory computer-readable storage medium of claim 18, wherein:

the first financial instrument is an equity traded at the first trading center and at least another trading center; and the at least one characteristic of the first financial instrument includes a value depending on a price of the equity.

\* \* \* \* \*